May 19, 1970     R. G. HUMPHREY     3,512,888

OPTICAL RANGING SYSTEMS

Filed March 29, 1965

INVENTOR,
ROBERT G. HUMPHREY

BY: Harry M. Saragovitz,
Edward J. Kelly,
Herbert Berl &
Charles L. Whitham    Attorneys.

United States Patent Office 3,512,888
Patented May 19, 1970

3,512,888
OPTICAL RANGING SYSTEMS
Robert G. Humphrey, Rockville, Md., assignor to the United States of America as represented by the Secretary of the Army
Filed Mar. 29, 1965, Ser. No. 444,514
Int. Cl. G01c 3/08
U.S. Cl. 356—4
2 Claims

ABSTRACT OF THE DISCLOSURE

A system for ranging or remote optical detection which utilizes active optical detection apparatus that is sensitive to objects located within a narrow range about the desired detection range and insensitive to objects located at longer or shorter ranges. The apparatus includes an optical transmitter and a receiver which causes the reflected light to be highly concentrated in the region where detection is required and diffuse elsewhere. The transmitter and receiver have separate imaging systems and the two images form a common image in a detection plane at the desired range of detection.

---

Figures 1, 2:
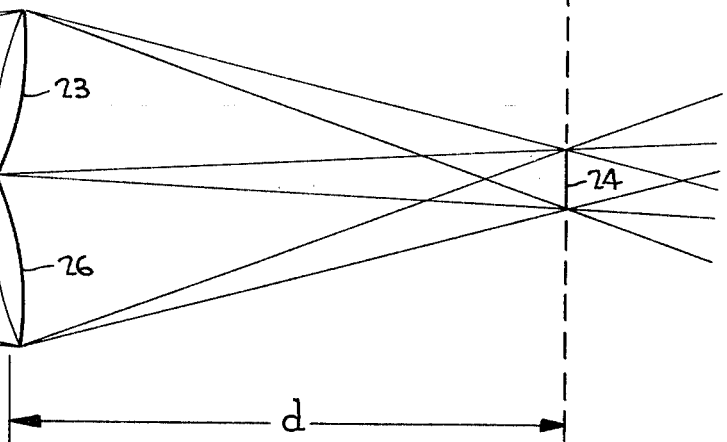

The invention described herein may be manufactured and used by or for the Government of the United States of America for governmental purposes without the payment to me of any royalty thereon.

This invention relates generally to ranging or remote object detection systems, and more particularly to active optical detection systems that are sensitive to objects located within a narrow range about the desired detection range and insensitive to objects located at longer or shorter ranges.

Fixed or predetermined distance ranging and object detection systems have considerable utility in many diverse fields. For example, fixed distance ranging systems have been employed as the principal element in aircraft collision avoidence systems. The basic requirement of these systems is to detect any object that penetrates a "sphere of influence" about an aircraft and either provide a warning to the pilot or automatically initiate evasive action. The radius of the "sphere of influence" is determined by several factors including the speed of the aircraft and its maneuverability. A related but seldom realized application of fixed distance object detection systems is in automobile collision warning indicators. The value of such indicators has long been recognized by those concerned with automobile traffic safety; however, there has been no widespread adoption of automobile collision warning indicators either by industry or by the public due to the disadvantages of previously known detection systems. A further use of predetermined distance object detection systems is for the detection of articles of mass production in automatic control systems. Specific applications in the automatic control field include object detectors for monitoring, registering and sorting systems.

Typically, ranging and object detection systems have incorporated radar techniques; that is, the transmission of energy, the reception of the energy reflected by an object, and the determination of the distance of the object by measuring the elapsed time between the transmission of the energy and the reception of the reflected energy. Whether the energy is radio frequency energy, light, sound, or any other suitable form of energy, these systems are characterized as being very complex, usually requiring modulation systems and frequency detectors. Furthermore, these systems will detect objects over a large range of distances; therefore, it is necessary to make modifications to the systems, otherwise objects outside the range of interest will produce spurious reflected signals. In certain applications, the disadvantages of radar ranging systems may be overcome by using well-known triangulation methods. These methods require two points of observation. This requirement is readily met where the distance from the object to be detected to the base line between the observation points is relatively short but is impractical and often impossible to satisfy when the distance is relatively great.

It is therefore an object of this invention to provide a simple and relatively inexpensive fixed or predetermined object detection system.

It is another object of the instant invention to provide an optical ranging system which does not require complex modulation or detection systems.

According to the present invention, the foregoing and other objects are attained by providing an optical system including a transmitter and a receiver which causes the transmitted light rays to be highly concentrated in the region where detection is required and diffuse elsewhere. This is accomplished by the use of two imaging systems, one for the transmitter and the other for the receiver. The two images of the transmitter source and the receiver detector field stops form a common image in a detection plane at the desired range of detection. The sensitive region of the system is, therefore, confined to the region of concentration of the rays which is in the vicinity of the image.

The specific nature of the invention, as well as other objects, aspects, uses and advantages therefore, will clearly appear from the following decription and from the accompanying drawing, in which:

FIG. 1 is illustrative of one embodiment of the invention which uses a common objective lens for the transmitter and the receiver; and FIG. 2 is illustrative of another embodiment of the invention which uses separatet objective lenses for the transmitter and the receiver.

Referring now to the drawings and more particularly to FIG. 1, there is shown a source of optical energy 11 which is connected to and driven by a source driver 12. The source may be a pulsed flashlamp, a pulsed GaAs solid state source, an incandescent lamp (in which case to source driver includes a chopper), a laser source (in which case auxiliary optics are required to spread the beam to fill the aperture), or any other source of sufficient radiance to permit detection. If the background light is present, modulation should be used, otherwise unmodulated sources are adequate. The field of the source 11 is shown as being fixed having some predetermined area. The area of the field may be established by the source itself or, more conventionally, the source in combination with auxiliary optics including a field stop. Since the area of the field determines the sensitivity of the system as is explained in greater detail below, it may be desirable to provide the source with an adjustable field stop to permit the area of the source field to be varied as required. The light rays generated by source 11 pass through a beamsplitter 13, an objective lens 14, and project an image 15 of the source onto the detection plane 16. As shown in FIG. 1, the detection plane 16 is located a known, predetermined distance $d$ from the objective lens 14. Depending on the application of the system, it may be desirable to be able to vary the distance $d$ over a range. This may be easily accomplished by using an objective lens system which has a mechanically variable focal length. In either case, whether the focal length of the objective lens is fixed or variable, it is necessary that the height of the image 15 be much smaller than the height of the aperture of the objective lens. If a diffuse reflector is located in the detection plane 16, then the reflected radiation from the source image 15 is again projected by objective lens 14 onto beamsplitter 13. Beamsplitter 13 reflects the projected source image onto a receiver field stop 17. The area of the receiver field as determined by the field stop 17 is equal to the area of the source field. If the area of the source field may be varied, the field stop 17 should be adjustable so that the receiver field may also be varied so as to always be equal in area to the source field. Thus, if a diffuse reflector lies exactly in the detection plane 16 at the image 15, then the image formed by the reflected light rays will coincide exactly with the field stop 17. For other reflector positions, the image formd by the reflected rays will not be sharp. The radiation that passes through the field stop 17 impinges on a photoelectric detector 18. The output of detector 18 is fed to a threshold amplifier 19 which produces an output pulse when the signal from the detector 18 exceeds a predetermined maximum. The threshold level of amplifier 19 is adjusted so that a pulse is generated only when an object is in the sensitive region near the image 15. The output pulse from amplifier 19 is supplied to a suitable indicator 20 which may, for example, provide an aural or visual indication of the presence of an object at the plane of detection 16. In the case of a collision avoidance system, such an indication would serve to warn the operator of a vehicle of a possible collision. In more complex collision avoidance systems such as the type adapted for use in many high performance aircraft, an automatic control system which would initiate evasive action would be substituted for indicator 20. In the case of assembly line automatic control systems, an electronic or electromechanical counter could be substituted for indicator 20. An object is detected only if it is located near the image 15 where the light rays are concentrated. If an object should intercept the entire transmitted light beam near the objective lens 14, insufficient reflected radiation is returned through the detector field stop 17 for detection. Fog invulnerability is possible since only fog in the sensitive region near the image 15 can contribute to a spurious signal, and the sensitive region can be made arbitrarily small. Invulnerability here means that the fog or cloud signal is too small to cause the threshold amplifier 19 to produce an output pulse. It is still possible under extremely low visibility conditions that attenuation of the transmitted and reflected radiation would be so severe that an object at the detection plane 16 would not be detected.

Since the transmitter and receiver are not separated in the configuration shown in FIG. 1 (in fact they are coincident), the ranging properties of the system are due entirely to the effect of the concentration of the light rays. An alternative system which has certain advantages is illustrated in FIG. 2 of the drawings. In this case, a source of optical energy 21 is driven by a source driver 22 as before. A transmitter lens 23 projects an image 24 of the source 21 onto the detection plane 25. Diffusely reflected light is now imaged by a separate receiver lens 26 onto a receiver field stop 27. The radiation passing through the field stop 27 impinges on a detector 28. The detector output signal is fed to a threshold amplifier 29 the output of which is supplied to an indicator 30 or other suitable utilization device as before. The operation of the object detector system shown in FIG. 2 is the same as the operation of the system shown in FIG. 1. The difference in the two systems is in their particular configurations; that is, in the system shown in FIG. 1, the transmitter and receiver share a common projecting lens system while the system shown in FIG. 2 employs separate transmitter and receiving lenses. With the system shown in FIG. 2, there is, in addition to the effect of concentration of light rays at the detection plane as in the system shown in FIG. 1, an additional effect due to triangulation since the transmitter and receiver lenses are now separated by the lens diameter, or slightly more, to provide mechanical clearance. There are several advantages to this configuration including the following: (1) the length of the sensitive region is reduced to about half that as in the case of the system shown in FIG. 1; (2) the already low response to objects near the aperture is further reduced; (3) with the beamsplitter eliminated, the total system transmission is improved by at least four times; and (4) the stray light problem is greatly alleviated since the source and detector field stops are no longer in the same chamber and since there are no common optical elements. It must be remembered, however, that these advantages are gained at the expense of the obvious economies and compact design afforded by the configuration shown in FIG. 1.

It will be apparent that the embodiments shown are only exemplary and that various modifications can be made in construction and arrangement within the scope of the invention as defined in the appended claims.

I claim as my invention:

1. An optical ranging system comprising:
   (a) a source of optical energy to project an area source of light;
   (b) transmitter means for projecting an image of said source of optical energy onto a detection plane at a predetermined distance from said optical ranging system, said image of said source covering a defined area in the detection plane, said transmitter means further including an objective lens having an aperture larger than the projected image of said source of optical energy;
   (c) detector means responsive to optical energy impinging thereon from a diffuse reflector for producing an indication of the detection of an object in the region of said image of said source of optical energy in the detection plane, said detector means further comprising:
      (1) a field stop having an area equal to the area of the image generated by said source of optical energy and reflected by an object in the region of said image of said source of optical energy in the detection plane, said field stop being positioned to intercept the reflected energy;
      (2) photoelectric means positioned to receive the energy passed by said field stop for generating an electric signal proportional to the optical energy impinging thereon; and
      (3) threshold means connected to receive the electric signal generated by said photoelectric means for producing an output indication when the level of said electric signal exceeds a predetermined minimum level corresponding to the detection of an object in the region of said image of said source of optical energy in the detection plane; and
   (d) receiver means for projecting reflected energy generated by said source of optical energy onto said detector means, such that if the image on said detector means were projected back by said receiver means to said detection plane, it would coincide with said image of said source of optical energy projected by said transmitter means and form a common image therewith in said detection plane, said receiver means further including:
      (1) said objective lens; and
      (2) a beamsplitter positioned to transmit energy generated by said source of optical energy to said objective lens while reflecting reflected energy generated by said source of optical energy and projected by said objective lens onto said detector means.

2. An optical ranging system as defined in claim 1 wherein said source of optical energy is modulated.

References Cited

UNITED STATES PATENTS

| | | | |
|---|---|---|---|
| 2,216,575 | 10/1940 | Seinfeld | 250—221 X |
| 2,437,608 | 3/1948 | Long et al. | |
| 3,013,467 | 12/1961 | Minsky | 250—215 XR |
| 3,170,151 | 2/1965 | Roth. | |
| 3,198,952 | 8/1965 | Benham et al. | |
| 3,335,285 | 8/1967 | Gally et al. | 250—221 |

RONALD L. WIBERT, Primary Examiner

F. L. EVANS, Assistant Examiner

U.S. Cl. X.R.

250—221